US011062007B2

United States Patent
(12) Ciano et al.

(10) Patent No.: US 11,062,007 B2

(45) **Date of Patent: *Jul. 13, 2021**

(54) AUTOMATED AUTHENTICATION AND ACCESS

(71) Applicant: INTERNATIONAL BUSINESS MACHINES CORPORATION, Armonk, NY (US)

(72) Inventors: Giuseppe Ciano, Rome (IT); Gianluca Della Corte, Rome (IT); Giuseppe Longobardi, Castellammare di Stabia (IT); Antonio M. Sgro, Fiumicino (IT)

(73) Assignee: International Business Machines Corporation, Armonk, NY (US)

(*) Notice: Subject to any disclaimer, the term of this patent is extended or adjusted under 35 U.S.C. 154(b) by 102 days.

This patent is subject to a terminal disclaimer.

(21) Appl. No.: 16/459,902

(22) Filed: Jul. 2, 2019

(65) Prior Publication Data

US 2019/0325124 A1 Oct. 24, 2019

Related U.S. Application Data

(63) Continuation of application No. 15/637,113, filed on Jun. 29, 2017, now Pat. No. 10,417,403.

(51) Int. Cl.

*G06F 21/32* (2013.01)
*H04L 29/06* (2006.01)

(Continued)

(52) U.S. Cl.

CPC .............. *G06F 21/32* (2013.01); *G06F 21/44* (2013.01); *H04L 63/0861* (2013.01);

(Continued)

(58) Field of Classification Search

CPC ..... G06F 21/32; G06F 21/44; H04L 63/0861; H04L 63/10; H04L 63/20; H04L 67/306; H04W 12/06

(Continued)

(56) References Cited

U.S. PATENT DOCUMENTS 8,254,647 B1 * 8/2012 Nechyba ................ G06K 9/036 382/118
8,261,090 B1 9/2012 Matsuoka (Continued)

OTHER PUBLICATIONS

Friedman, Mark J.; List of IBM Patents or Patent Applications Treated as Related; Jul. 2, 2019; 1 page.

*Primary Examiner* — Dereena T Cattungal
(74) *Attorney, Agent, or Firm* — Schmeiser, Olsen & Watts; Michael A. Petrocelli

(57) ABSTRACT

A method and system for improving automated software execution is provided. The method includes receiving in real time from a video retrieval device, visual data associated with a user of a hardware device. The user is identified with respect to the visual data. Internal software applications and hardware structures are scanned in real time and relationships between a group of Web based software applications and a group of internal software applications and hardware structures authorized for access by the user are determined. Information associated with network and hardware device access by the user is analyzed actions for execution with respect to access to the group of Web based software applications and internal software applications and hardware structures are determined. In response, the automated actions are executed with respect to access to the group of Web based software applications and internal software applications and hardware structures.

18 Claims, 6 Drawing Sheets

100
110a VIDEO RETRIEVAL DEVICE/SENSOR
110b VIDEO RETRIEVAL DEVICE/SENSOR
110n VIDEO RETRIEVAL DEVICE/SENSOR
134 WEB BASED APPLICATIONS
117
125 CIRCUITRY
CONTROLLER HARDWARE
104
119
145 HARDWARE/ SOFTWARE

(51) Int. Cl.
*H04W 12/06* (2021.01)
*H04L 29/08* (2006.01)
*G06F 21/44* (2013.01)

(52) U.S. Cl.
CPC .............. *H04L 63/10* (2013.01); *H04L 63/20* (2013.01); *H04L 67/306* (2013.01); *H04W 12/06* (2013.01); *H04L 67/02* (2013.01)

(58) Field of Classification Search
USPC .............................................................. 726/5
See application file for complete search history.

(56) References Cited

U.S. PATENT DOCUMENTS

| | | | | |
|---|---|---|---|---|
| 8,629,895 | B2 | 1/2014 | Lee | |
| 9,361,442 | B2 | 6/2016 | Dey et al. | |
| 2012/0162443 | A1* | 6/2012 | Allen | G06N 5/02 348/207.1 |
| 2012/0235790 | A1 | 9/2012 | Zhao et al. | |
| 2015/0199515 | A1* | 7/2015 | Qureshi | G06F 21/563 726/22 |
| 2015/0331711 | A1* | 11/2015 | Huang | G06F 3/0481 719/320 |
| 2016/0148042 | A1* | 5/2016 | Gonion | G06K 9/00241 715/784 |
| 2017/0160881 | A1* | 6/2017 | Kanemoto | G06N 7/005 |
| 2018/0336328 | A1* | 11/2018 | Rakshit | G06F 21/32 |
| 2019/0005213 | A1 | 1/2019 | Ciano | |

* cited by examiner

AUTOMATED AUTHENTICATION AND ACCESS

CROSS REFERENCE TO RELATED APPLICATIONS

This application is a continuation application claiming priority to Ser. No. 15/637,113 filed Jun. 29, 2017, the contents of which are hereby incorporated by reference.

FIELD

The present invention relates generally to a method for authenticating a user and executing associated actions and in particular to a method and associated system for improving facial recognition authentication technology associated with enabling automated actions with respect to accessing hardware or software.

BACKGROUND

Accurately enabling user access to components typically includes an inaccurate process with little flexibility. Controlling device access permissions may include a complicated process that may be time consuming and require a large amount of resources. Accordingly, there exists a need in the art to overcome at least some of the deficiencies and limitations described herein above.

SUMMARY

A first aspect of the invention provides an automated software execution improvement method comprising: receiving in real time, by a processor of a hardware device from a video retrieval device, visual data associated with a user of the hardware device; identifying, by the processor based on execution of facial recognition software with respect to the visual data, the user; scanning in real time, by the processor, Web based software applications accessible via the hardware device and internal software applications and hardware structures internal to the hardware device; determining, by the processor based on results of the scanning and the identifying, relationships between a group of Web based software applications of the Web based software applications and a group of internal software applications and hardware structures of the internal software applications and hardware structures internal to the hardware device authorized for access by the user; analyzing, by the processor, information associated with network and hardware device access by the user; ranking, by the processor based on results of the analyzing, the group of Web based software applications and the group of internal software applications and hardware structures; defining, by the processor based on results of the ranking, automated actions for execution with respect to access to the group of Web based software applications and the group of internal software applications and hardware structures; and executing, by the processor based on the results of the ranking, the automated actions with respect to access to the group of Web based software applications and the group of internal software applications and hardware structures.

A second aspect of the invention provides a computer program product, comprising a computer readable hardware storage device storing a computer readable program code, the computer readable program code comprising an algorithm that when executed by a processor of a hardware device implements an automated software execution improvement method, the method comprising: receiving in real time, by the processor from a video retrieval device, visual data associated with a user of the hardware device; identifying, by the processor based on execution of facial recognition software with respect to the visual data, the user; scanning in real time, by the processor, Web based software applications accessible via the hardware device and internal software applications and hardware structures internal to the hardware device; determining, by the processor based on results of the scanning and the identifying, relationships between a group of Web based software applications of the Web based software applications and a group of internal software applications and hardware structures of the internal software applications and hardware structures internal to the hardware device authorized for access by the user; analyzing, by the processor, information associated with network and hardware device access by the user; ranking, by the processor based on results of the analyzing, the group of Web based software applications and the group of internal software applications and hardware structures; defining, by the processor based on results of the ranking, automated actions for execution with respect to access to the group of Web based software applications and the group of internal software applications and hardware structures; and executing, by the processor based on the results of the ranking, the automated actions with respect to access to the group of Web based software applications and the group of internal software applications and hardware structures.

A third aspect of the invention provides a hardware device comprising a processor coupled to a computer-readable memory unit, the memory unit comprising instructions that when executed by the computer processor implements an automated software execution improvement method comprising: receiving in real time, by the processor from a video retrieval device, visual data associated with a user of the hardware device; identifying, by the processor based on execution of facial recognition software with respect to the visual data, the user; scanning in real time, by the processor, Web based software applications accessible via the hardware device and internal software applications and hardware structures internal to the hardware device; determining, by the processor based on results of the scanning and the identifying, relationships between a group of Web based software applications of the Web based software applications and a group of internal software applications and hardware structures of the internal software applications and hardware structures internal to the hardware device authorized for access by the user; analyzing, by the processor, information associated with network and hardware device access by the user; ranking, by the processor based on results of the analyzing, the group of Web based software applications and the group of internal software applications and hardware structures; defining, by the processor based on results of the ranking, automated actions for execution with respect to access to the group of Web based software applications and the group of internal software applications and hardware structures; and executing, by the processor based on the results of the ranking, the automated actions with respect to access to the group of Web based software applications and the group of internal software applications and hardware structures.

The present invention advantageously provides a simple method and associated system capable of accurately enabling user access to components.

DETAILED DESCRIPTION

Figure 1:
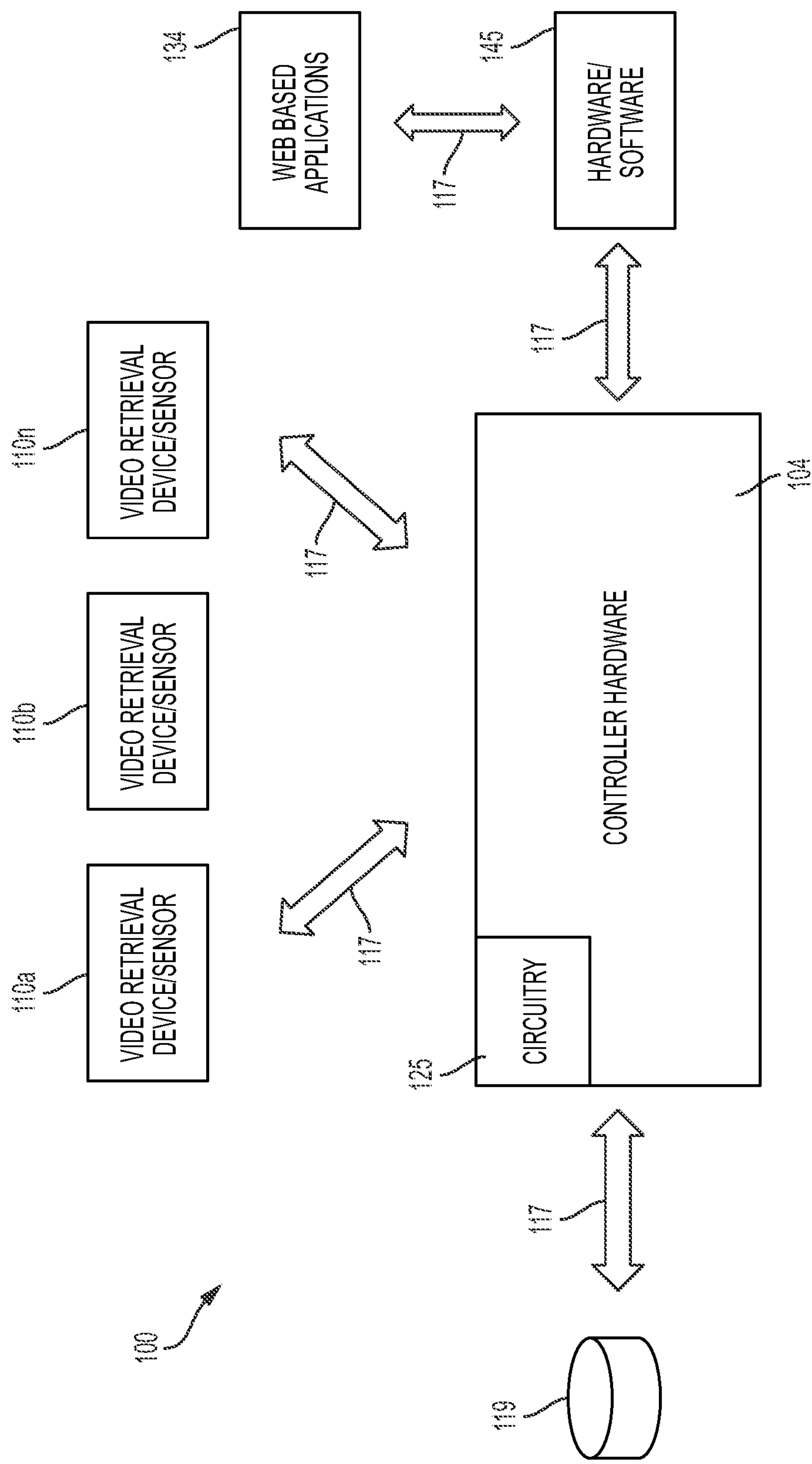
FIG. 1 illustrates a system for improving facial recognition authentication technology associated with enabling automated actions with respect to accessing hardware or software, in accordance with embodiments of the present invention.

FIG. 1 illustrates a system 100 for improving facial recognition authentication technology associated with enabling automated actions with respect to accessing hardware or software, in accordance with embodiments of the present invention. System 100 enables a process for automatically executing pre-configured actions with respect to software applications or hardware associated with an electronic device based on facial recognition of a user via video (retrieval) devices/sensors 110*a* . . . 110*n*. System 100 executes the following process associated with executing the pre-configured actions:

1. Visual data associated with recognized entities (e.g., users) is received from entity discoverer (ED) hardware/software via a camera (e.g., video (retrieval) devices/sensors 110*a* . . . 110*n*) of a hardware device. In response, multiple applications (e.g., social media application) are scanned (via entity crawler software) to retrieve information related to the entities.
2. The multiple applications are ranked with respect to defining an order for executing the pre-defined actions with respect to the multiple applications.
3. The pre-defined actions are executed based on instructions retrieved from an application and entity registry (AER). The instructions specify an application for management, entities that have been discovered and recognized, associated links between the application and the entities, and associated actions to be performed with respect to the application.

System 100 of FIG. 1 includes controller hardware 104 (i.e., specialized hardware device(s)), video (retrieval) devices/sensors 110*a* . . . 110*n*, hardware /software 145, Web based applications 134, and a database 119 interconnected through a network 117. Controller hardware 104 includes specialized circuitry 125 that may include specialized software. Controller hardware 104 may alternatively be directly connected to or integral with video devices/sensors 110*a* . . . 110*n*. Video devices/sensors 110*a* . . . 110*n* may include video retrieval devices and internal or integrated sensors. Video devices/sensors 110*a* . . . 110*n* may include any type of video retrieval devices including, inter alia, video cameras, infrared cameras, still cameras, etc. Video devices/sensors 110*a* . . . 110*n* may include any type of sensors including, inter alia, infrared sensors, optical sensors, motion sensors, etc. Controller hardware 104, video devices/sensors 110*a* . . . 110*n*, and hardware /software system 145 may include specialized internal circuitry/logic. Controller hardware 104, video devices/sensors 110*a* . . . 110*n*, and hardware /software system 145 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, controller hardware 104, video devices/sensors 110*a* . . . 110*n*, and hardware/software system 145 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving facial recognition authentication technology associated with enabling automated actions with respect to accessing hardware or software. Network 117 may include any type of network including, inter alia, a local area network, (LAN), a wide area network (WAN), the Internet, a wireless network, etc. Alternatively, network 117 may include application programming interfaces (API).

System 100 enables a process for managing hardware/software 145 (e.g., software applications and associated hardware such as storage devices) and associated Web based applications 134 based on actions triggered automatically via a visual recognition process executed via at least one of video devices/sensors 110*a* . . . 110*n* connected to controller hardware 104. In response, information is retrieved or derived from the (e.g., social network) hardware/software 145 and associated Web based applications 134. The information is associated with previous interactions between hardware/software 145 and a user of controller hardware 104. The actions may be defined with respect to policies and may be performed automatically by controller hardware 104. System 100 is configured to execute the (configurable) actions with respect to hardware/software 145 (e.g., closing the software applications, maximizing the software applications, etc.) determined to be linked to a recognized (via at least one of video devices/sensors 110*a* . . . 110*n*) entity (user). A link may be provided as input from the entity defining a proper policy. Alternatively, the link may be derived automatically by performing scanning process with respect to application information or specified search engines. The following process describes an implementation example illustrating interactions with social media applications:

The process is initiated when an instant messaging chat is enabled with a user A. Likewise a simultaneous video chat session is enabled with a user B. An associated defined action specifies disabling the instant messaging chat with user A if user B is recognized using controller hardware 104. Likewise, an associated defined action specifies maximizing the video chat session with user B if user A is recognized using controller hardware 104. System 100 executes the following process for identifying dynamic relationships between users and associated actions executed with respect to currently running software applications visible to users:

1. A context and current usage for specified applications is identified by retrieving a list of the currently running software applications and identifying a scope of their usage. For example, a scope may comprise, inter alia, work related usage, leisure related usage, travel related usage, etc. A scope of usage may be determined by analyzing currently running software applications and retrieving or deriving a category (e.g., work, leisure, shopping, vacation, etc.). After a category has been identified, an associated usage is analyzed to enforce the context. Additionally, each software application and associated context is classified so that a confidence level indicating a current scope for the associated software application is retrieved via execution of language classifier software.
2. Faces of users of system 100 are identified via facial recognition software. Each identified user is analyzed and relationships between the user and an associated software application of the currently running software applications determined.
3. A list of potential network channels is analyzed to determine relevant information for ranking the network channels. For example, channels L1, L2, L3, . . . ranked in a retrieval order.
4. The list of potential network channels is queried for information associated with the user and relationships between the user and the identified context are verified. In response, an index is calculated for each network channel thereby mapping relationships between the context and the software application entity (e.g., a number between 0 and 1) as follows:

$$\text{Index}_{socialchannel} = \frac{\text{number of conversations about context with Person}}{\text{number of conversations with Person}}$$

5. A relationship index between the user and an application associated with each identified context is calculated as follows:

$$RelationshipIndex = \frac{\Sigma_{\forall socialchannel}\text{Index}_{socialchannel}}{\text{Number of social channels}}$$

Therefore, a relationship index comprising a value close to 1 indicates a strong relationship between the user, the application, and the context. Likewise, a relationship index comprising a value close to 0 indicates no relationship between the user, the application, and the context. Table 1 illustrates the relationships between the user, the application, and the context.

TABLE 1

| Application | Context | Relationship Index |
|---|---|---|
| Processor | Job | 0.8 |
| Viewer | Job | 0.7 |
| Search engine | Shopping | 0.1 |
| Image app | Personal | 0 |

6. An associated action defined with respect to the relationship index is executed with respect to a defined threshold.
7. A registry is populated with the relationships between application and user thereby allowing system 100 to be cognitive.

Figure 2:
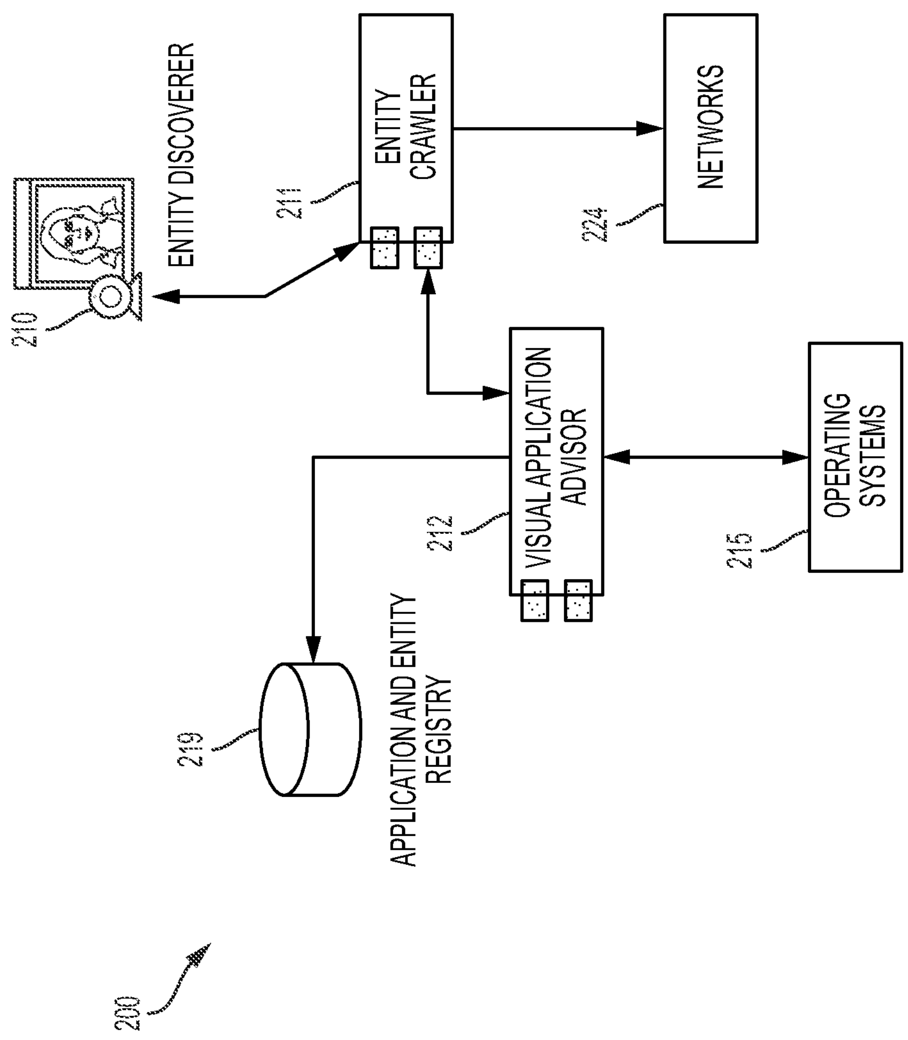
FIG. 2 illustrates an implementation example enabled by the system of FIG. 1 for enabling automated actions with respect to accessing hardware or software, in accordance with embodiments of the present invention.

FIG. 2 illustrates an implementation example enabled by system 100 of FIG. 1 for enabling automated actions with respect to accessing hardware or software, in accordance with embodiments of the present invention. The example illustrated in FIG. 2 comprises a system 200 that includes an application and entity registry repository (AER) 219, entity discoverer software (ED) 210, entity crawler software (EC) 211, and visual application advisor software (VAA) 212 in communication with operating systems 215 and networks 224. AER 219 comprises links between software applications and associated entities. Additionally, AER 219 comprises actions for execution with respect to discovered entities. Actions comprise a set of basic predefined rules in combination with templates for customization of software. ED 210 (e.g., comprising video retrieval devices (embedded or externally placed) and associated control hardware and software) is configured to recognize and discover the entities defined in AER 219. EC 211 is configured to retrieve information from local repositories and networks information for classifying an entity with respect to a list of pre-defined and configurable rules such as, inter alia, age, relationships, etc. VAA 212 calculates rankings based on the entities discovered and information and interactions retrieved from the EC 211. The rankings are used to analyzed actions to be performed on with respect to an applications based on results of the facial recognition process. VAA 212 executed determined actions based specified configurations.

System 100 executes the following process associated with managing software applications via video recognition:

Entities discovered from EA 210 are received. In response, EC 211 executes scanning activities for retrieving information associated with the entities received and identifying the entities. For example, scanning techniques may include: Retrieve information from: social network applications; social photo/video sharing Websites; a local system or network; an external source (e.g., a database, a user repository, etc.). In response, EC 211 searches for local and network information such as chat transcripts, phone calls, etc. for calculating and deriving a ranking for application in order to define actions to be performed with respect to software applications. Subsequently, VAA 212 retrieves runtime information (from AER 219) associated with: an application to be managed; entities discovered and recognized; links between applications and entities; and actions to be performed with respect to the software applications if linked entities are discovered. All aforementioned information is used to enable the VAA 212 to invoke the actions defined in policies.

Figure 3:
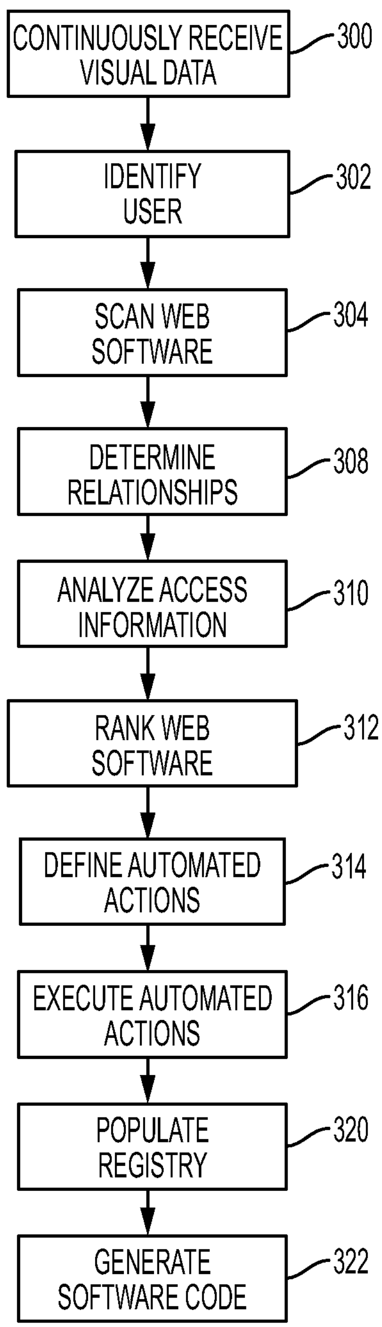
FIG. 3 illustrates an algorithm detailing a process flow enabled by the system of FIG. 1 for improving facial recognition authentication technology associated with enabling automated actions with respect to accessing hardware or software, in accordance with embodiments of the present invention.

FIG. 3 illustrates an algorithm detailing a process flow enabled by system 100 of FIG. 1 for improving facial recognition authentication technology associated with enabling automated actions with respect to accessing hardware or software, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by controller hardware 104 and video device/sensor 110*a* . . . 110*n* of FIG. 1. In step 300, visual data associated with a user of a hardware device is received in real time from a video retrieval device. In step 302, the user is identified based on execution of facial recognition software with respect to the visual data. In step 304, Web based software applications (accessible via the hardware device and internal software applications) and hardware structures (internal to the hardware device) are scanned in real time. In step 308, relationships are determined based on results off steps 302 and 304. The relationships comprise relationships between a group of Web based software applications and a group of internal software applications and hardware structures authorized for access by the user. Determining the relationships may include identifying a context and current usage by the user of the group of Web based software applications and the group of internal software applications and hardware structures. Identifying the context and current usage may include: retrieving a list of currently running software applications; and determining a type of usage associated with applications of the list of currently running software applications. Additionally, determining the relationships may further include the following alternative options:

1. Retrieving data indicating relationships between the user and the group of Web based software applications and the group of internal software applications and hardware structures.
2. Selecting specified Websites for retrieving data for identifying the context and current usage.
3. Querying a user database with respect to with respect to the group of Web based software applications and the group of internal software applications and hardware structures; determining user based relationships between the user and the group of Web based software applications and the group of internal software applications and hardware structures; and mapping the user based relationships to the context and current usage. Additionally, a relationship index defining a relationship between the user, an additional user, and the context and current usage is determined. In step 310, information associated with network and hardware device access by the user is analyzed. In step 312, the group of Web based software applications and the group of internal software applications and hardware structures are ranked based on results of step 310. In step 314, automated actions for execution with respect to access to the group of Web based software applications and the group of internal software applications and hardware structures are defined. In step 316, the automated actions are executed. In step 320, a registry is populated with the relationships. In step 322, software code for executing the actions (of step 316) is generated.

Figure 4:
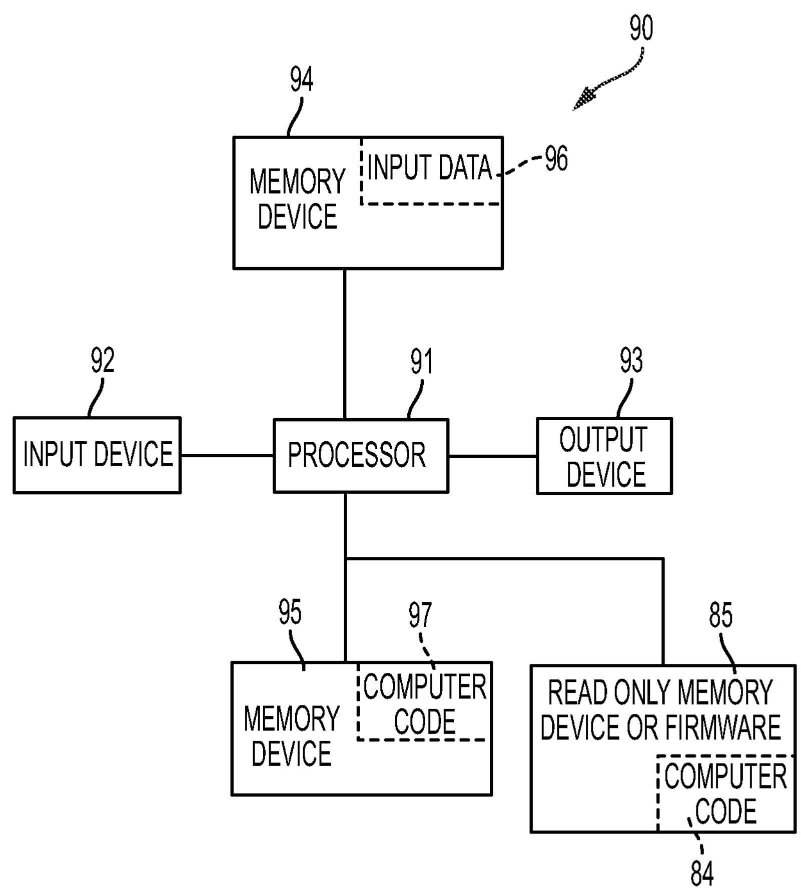
FIG. 4 illustrates a computer system used by the system of FIG. 1 for improving facial recognition authentication technology associated with enabling automated actions with respect to accessing hardware or software, in accordance with embodiments of the present invention.

FIG. 4 illustrates a computer system 90 (e.g., controller hardware 104 and/or video device/sensor 110a . . . 110n of FIG. 1) used by or comprised by the system of FIG. 1 for improving facial recognition authentication technology associated with enabling automated actions with respect to accessing hardware or software, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for improving facial recognition authentication technology associated with enabling automated actions with respect to accessing hardware or software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve facial recognition authentication technology associated with enabling automated actions with respect to accessing hardware or software. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving facial recognition authentication technology associated with enabling automated actions with respect to accessing hardware or software. In another embodiment, the invention provides a business method that performs the process steps of the invention on a subscription, advertising, and/or fee basis. That is, a service supplier, such as a Solution Integrator, could offer to enable a process for improving facial recognition authentication technology associated with enabling automated actions with respect to accessing hardware or software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
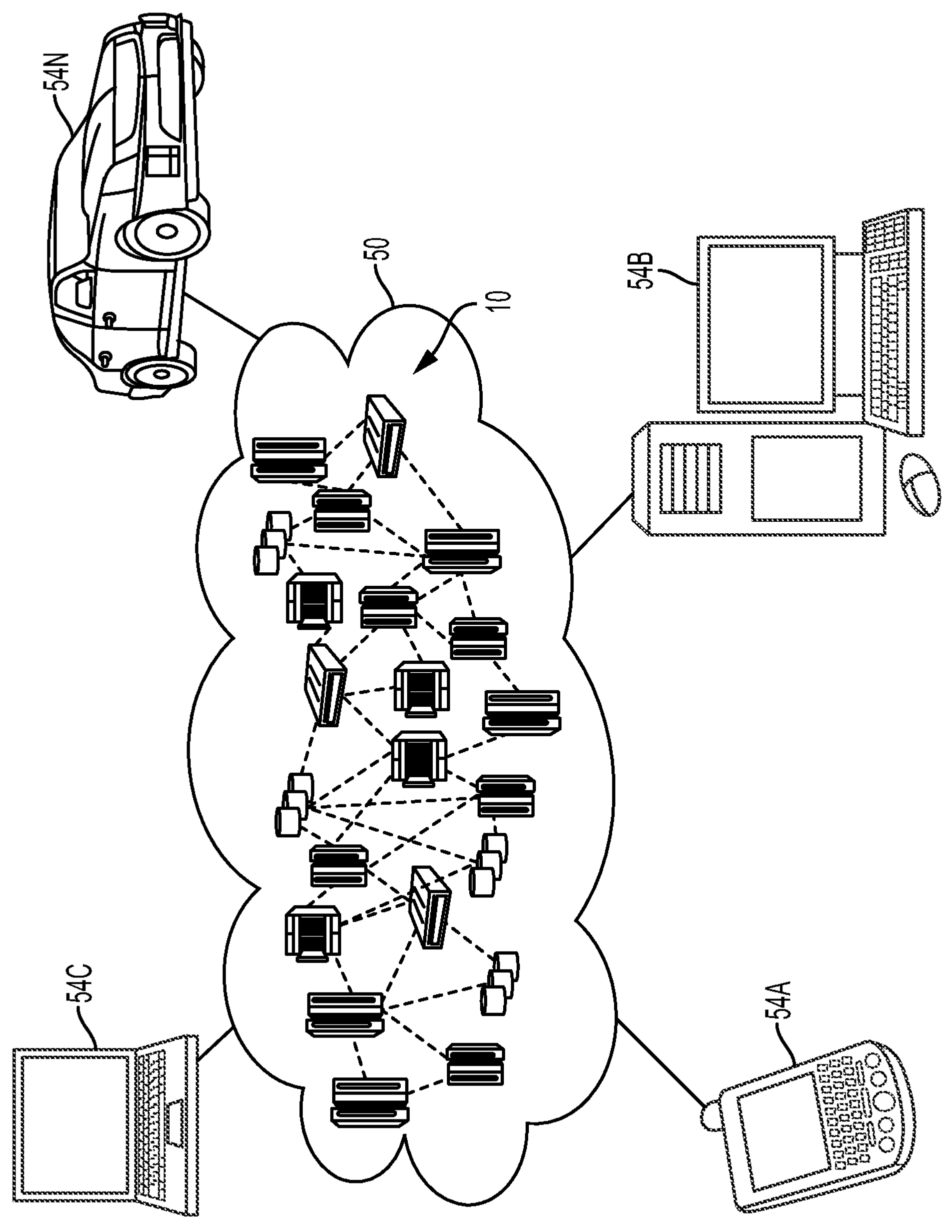
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
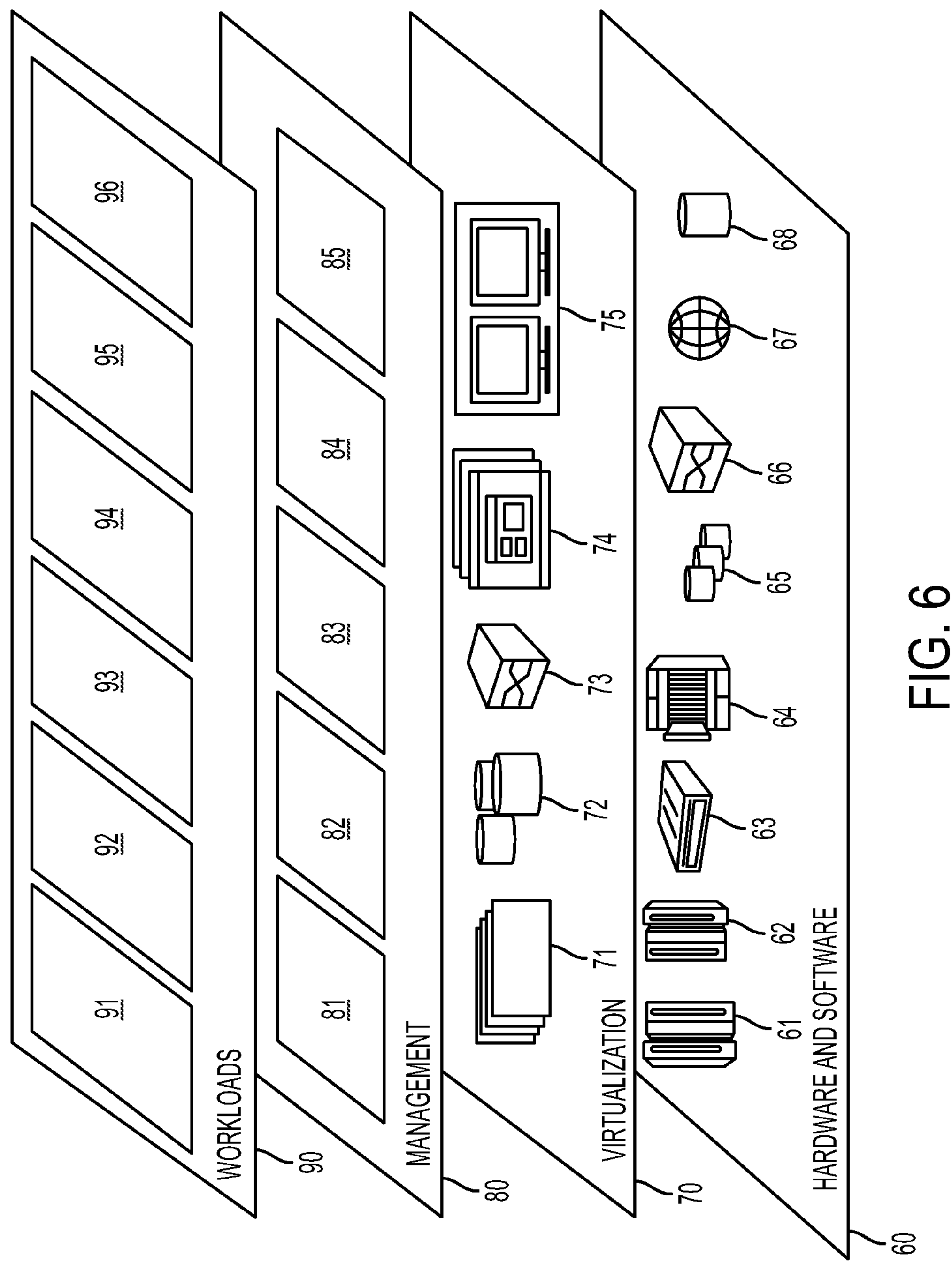
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving facial recognition authentication technology associated with enabling automated actions with respect to accessing hardware or software 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated software execution improvement method comprising:

identifying, by a processor of a hardware device from a video retrieval device based on execution of facial recognition software with respect to visual data associated with a user of said hardware device, said user;

automatically scanning in real time, by said processor, Web based software applications installed and accessible via said hardware device and internal software applications and hardware structures internal to said hardware device;

determining, by said processor based on results of said scanning and said identifying, relationships between a group of Web based software applications of said Web based software applications and a group of internal software applications and hardware structures of said internal software applications and hardware structures internal to said hardware device authorized for access by said user;

ranking, by said processor based on a retrieval order of network channels associated with hardware device access by said user, said group of Web based software applications and said group of internal software applications and hardware structures, wherein the network channels are ranked based on a relationship index comprising a value indicating a relationship between the user, the Web based software applications, and identifying a context and current usage by said user of said group of Web based software applications and said group of internal software applications and hardware structures;

defining, by said processor based on results of said ranking, automated actions for execution with respect to access to said group of Web based software applications and said group of internal software applications and hardware structures; and executing, by said processor based on said results of said ranking, said automated actions with respect to access to said group of Web based software applications and said group of internal software applications and hardware structures.

2. The method of claim 1, wherein said identifying said context and current usage comprises:

retrieving a list of currently running software applications of said group of Web based software applications and said group of internal software applications and hardware structures; and determining a type of usage associated with said applications of said list of currently running software applications.

3. The method of claim 1, wherein said determining said relationships further comprises:

retrieving data indicating relationships between said user and said group of Web based software applications and said group of internal software applications and hardware structures.

4. The method of claim 1, wherein said determining said relationships further comprises:

selecting specified Websites for retrieving data for said identifying said context and current usage.

5. The method of claim 1, wherein said determining said relationships further comprises:

querying a user database with respect to with respect to said group of Web based software applications and said group of internal software applications and hardware structures;

determining based on results of said querying, user based relationships between said user and said group of Web based software applications and said group of internal software applications and hardware structures; and mapping said user based relationships to said context and current usage.

6. The method of claim 5, further comprising:

determining a relationship index defining a relationship between said user, an additional user, and said context and current usage.

7. The method of claim 6, wherein said executing said automated actions is further based on said relationship index.

8. The method of claim 1, further comprising:

populating, by said processor, a registry with said relationships; and generating, by said processor based on said registry, software code for performing said executing.

9. The method of claim 1, further comprising:

providing at least one support service for at least one of creating, integrating, hosting, maintaining, and deploying computer-readable code in the control hardware, said code being executed by the computer processor to implement: said identifying, said automatically scanning in real time, said determining said relationships, said ranking, said defining, and said executing.

10. A computer program product, comprising a computer readable hardware storage device storing a computer readable program code, said computer readable program code comprising an algorithm that when executed by a processor of a hardware device implements an automated software execution improvement method, said method comprising:

identifying, by said processor from a video retrieval device based on execution of facial recognition software with respect to visual data associated with a user of said hardware device, said user;

automatically scanning in real time, by said processor, Web based software applications installed and accessible via said hardware device and internal software applications and hardware structures internal to said hardware device;

determining, by said processor based on results of said scanning and said identifying, relationships between a group of Web based software applications of said Web based software applications and a group of internal software applications and hardware structures of said internal software applications and hardware structures internal to said hardware device authorized for access by said user;

ranking, by said processor based on a retrieval order of network channels associated with hardware device access by said user, said group of Web based software applications and said group of internal software applications and hardware structures, wherein the network channels are ranked based on a relationship index comprising a value indicating a relationship between the user, the Web based software applications, and identifying a context and current usage by said user of said group of Web based software applications and said group of internal software applications and hardware structures;

defining, by said processor based on results of said ranking, automated actions for execution with respect to access to said group of Web based software applications and said group of internal software applications and hardware structures; and executing, by said processor based on said results of said ranking, said automated actions with respect to access to said group of Web based software applications and said group of internal software applications and hardware structures.

11. The computer program product of claim 10, wherein said identifying said context and current usage comprises:

retrieving a list of currently running software applications of said group of Web based software applications and said group of internal software applications and hardware structures; and determining a type of usage associated with said applications of said list of currently running software applications.

12. The computer program product of claim 10, wherein said determining said relationships further comprises:

retrieving data indicating relationships between said user and said group of Web based software applications and said group of internal software applications and hardware structures.

13. The computer program product of claim 10, wherein said determining said relationships further comprises:

selecting specified Websites for retrieving data for said identifying said context and current usage.

14. The computer program product of claim 10, wherein said determining said relationships further comprises:

querying a user database with respect to with respect to said group of Web based software applications and said group of internal software applications and hardware structures;

determining based on results of said querying, user based relationships between said user and said group of Web based software applications and said group of internal software applications and hardware structures; and mapping said user based relationships to said context and current usage.

15. The computer program product of claim 14, wherein said method further comprises:

determining a relationship index defining a relationship between said user, an additional user, and said context and current usage.

16. The computer program product of claim 15, wherein said executing said automated actions is further based on said relationship index.

17. The computer program product of claim 10, wherein said method further comprises:

populating, by said processor, a registry with said relationships; and generating, by said processor based on said registry, software code for performing said executing.

18. A hardware device comprising a processor coupled to a non-transitory computer readable medium comprising instructions that when executed by the computer processor implements an automated software execution improvement method comprising:

identifying, by said processor from a video retrieval device based on execution of facial recognition software with respect to visual data associated with a user of said hardware device, said user;

automatically scanning in real time, by said processor, Web based software applications installed and accessible via said hardware device and internal software applications and hardware structures internal to said hardware device;

determining, by said processor based on results of said scanning and said identifying, relationships between a group of Web based software applications of said Web based software applications and a group of internal software applications and hardware structures of said internal software applications and hardware structures internal to said hardware device authorized for access by said user;

ranking, by said processor based on a retrieval order of network channels associated with hardware device access by said user, said group of Web based software applications and said group of internal software applications and hardware structures, wherein the network channels are ranked based on a relationship index comprising a value indicating a relationship between the user, the Web based software applications, and identifying a context and current usage by said user of said group of Web based software applications and said group of internal software applications and hardware structures;

defining, by said processor based on results of said ranking, automated actions for execution with respect to access to said group of Web based software applications and said group of internal software applications and hardware structures; and executing, by said processor based on said results of said ranking, said automated actions with respect to access to said group of Web based software applications and said group of internal software applications and hardware structures.

* * * * *